March 7, 1939.　　　　　F. H. LOFTUS　　　　　2,149,610
REGENERATOR
Filed Jan. 4, 1938　　　3 Sheets-Sheet 1
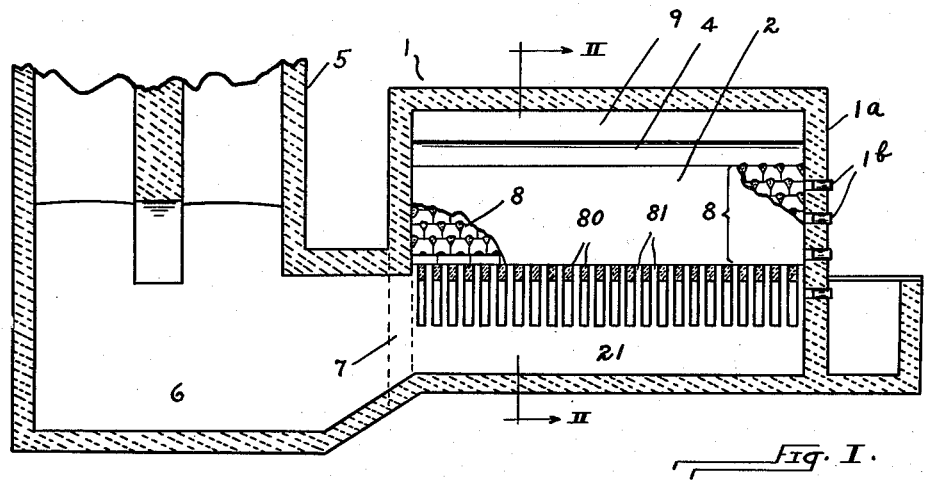
Fig. I.
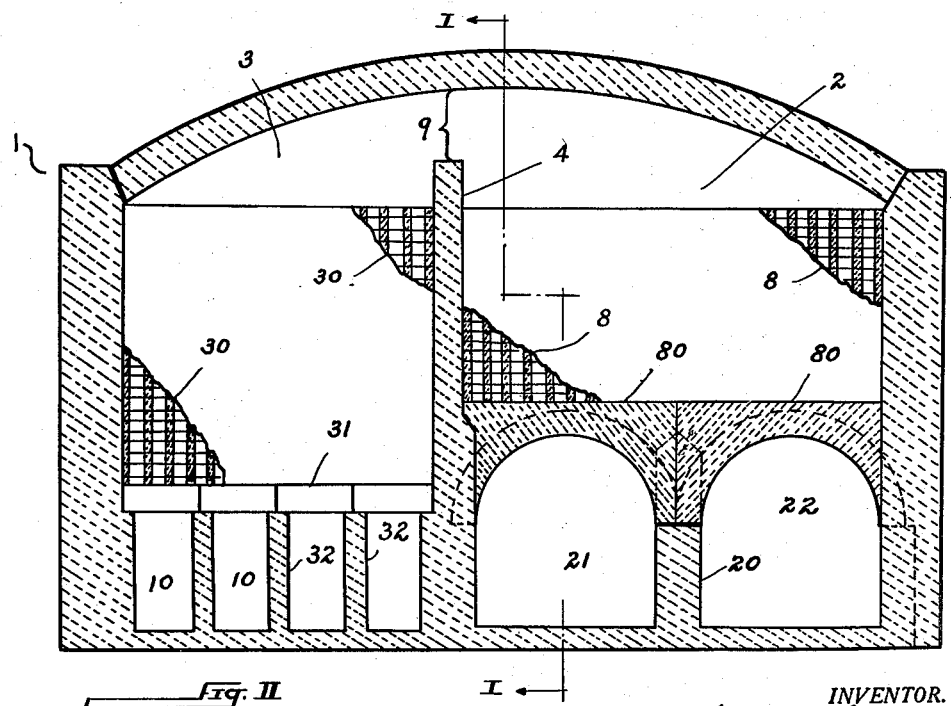
Fig. II.
INVENTOR.
Fred H. Loftus
BY Christy and Wharton
ATTORNEYS.

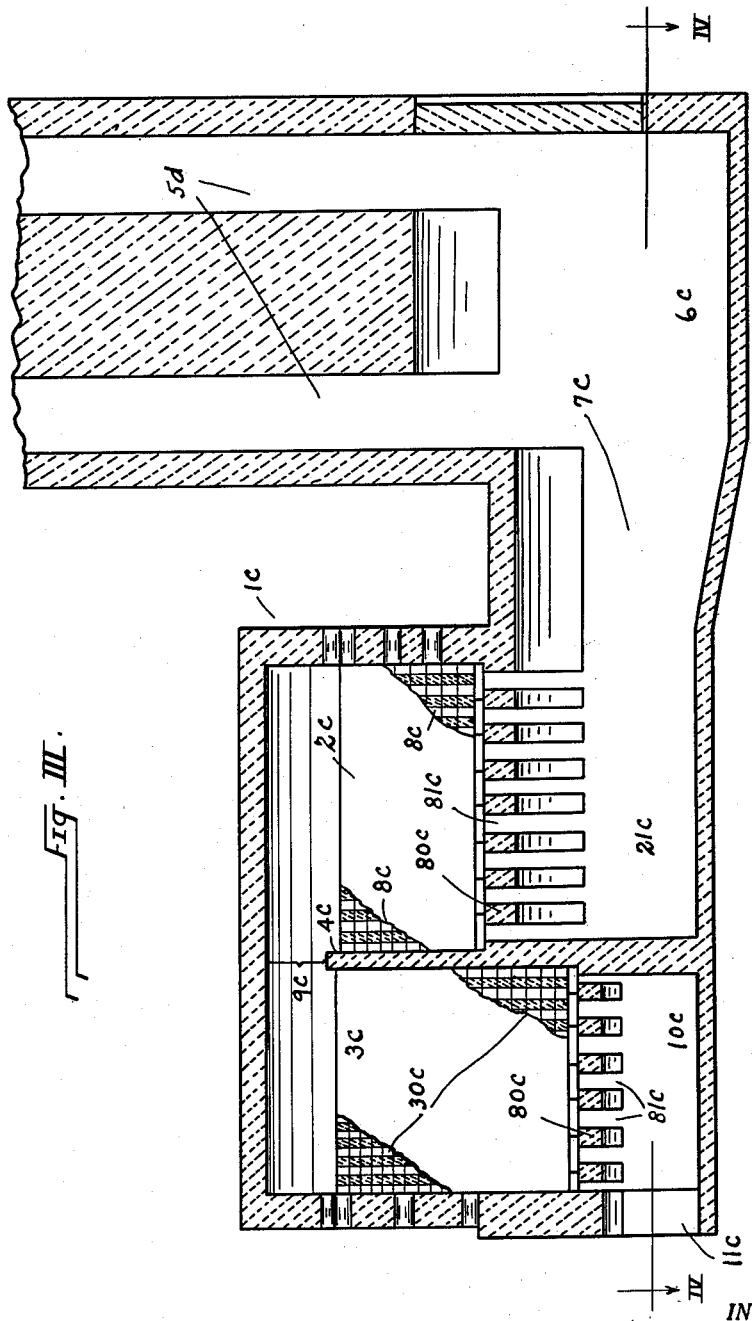

March 7, 1939. F. H. LOFTUS 2,149,610
REGENERATOR
Filed Jan. 4, 1938 3 Sheets-Sheet 3
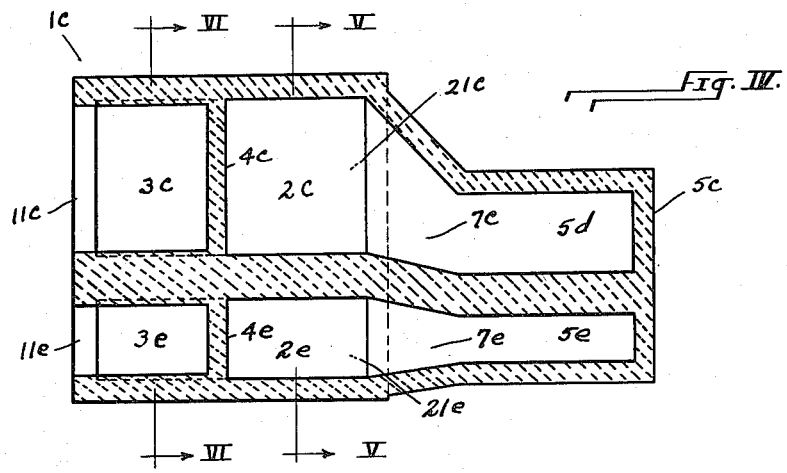
Fig. IV.
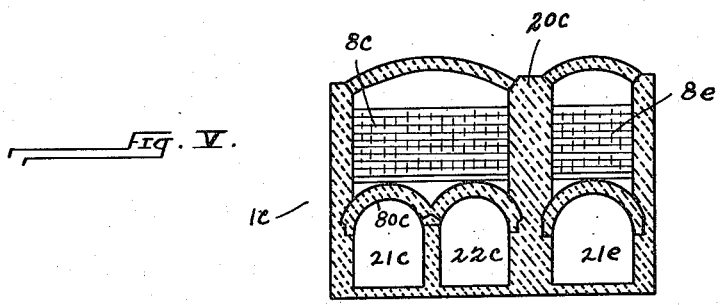
Fig. V.
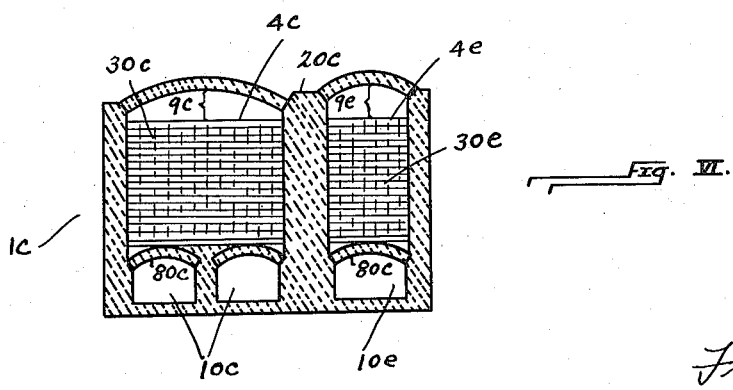
Fig. VI.
INVENTOR.
Fred. H. Loftus
BY Christy and Marton
ATTORNEYS.

Patented Mar. 7, 1939

2,149,610

UNITED STATES PATENT OFFICE 2,149,610

REGENERATOR

Fred H. Loftus, Mount Lebanon, Pa.

Application January 4, 1938, Serial No. 183,242

3 Claims. (Cl. 263—19)

My invention relates to regenerative furnaces, and consists in improvements both in the construction of and in method of operating the regenerators of such furnaces.

In exemplary way, I shall describe the invention as it is practised in open-hearth furnaces of the steel industry.

In recent years the operating charges of open-hearth furnaces have been progressively increased, until now some furnaces are operated with charges exceeding their rated capacities by as much as 33⅓ per cent., with the result that it has become difficult to obtain, within the space available, regenerators of adequate air-preheating capacity. The problem has been partially solved, by using fuel oil instead of the usual producer gas, so that the regenerators otherwise employed in preheating the producer gas may be used to assist the air-preheating regenerators. When using oil as the fuel, however, large quantities of dust and iron oxide are carried over into the regenerators, this being particularly noticeable when, as sometimes is the case, the furnace charge includes substantial quantities of sheet scrap and other thin or finely divided scrap. Under such conditions, the checker-work of the regenerators becomes fouled in relatively short time, and the furnace is handicapped in its operation, both in rate of production and in economy. More particularly, the invention consists in refinements in the construction of and method of operating open-hearth furnace regenerators, to the end that the molten slag and dust particles entrained in the hot waste gases of the furnace may in greater degree be prevented from fouling the checkerwork of the regenerators. I also aim to deliver preheated air to the furnace at higher rates and temperatures.

In the following specification, I shall first describe my invention as it has been embodied in the regenerators of an oil fired open-hearth furnace, in which only the air for combustion (and not the fuel) is preheated in the regenerators, and then I shall describe it as it is employed in regenerators that are fired with gaseous fuel, or mixtures of gaseous fuel and oil, in which the gaseous fuel as well as the air are preheated in the regenerators.

In the accompanying drawings Fig. I is a view in longitudinal, vertical section of a regenerator in which and in the operation of which the invention is realized; Fig. II is a view of the regenerator in cross-section and to larger scale, the plane of section of Fig. I being indicated at I—I in Fig. II and that of Fig. II at II—II in Fig. I; Fig. III is a view in longitudinal, vertical section through a regenerator of modified construction; Fig. IV is a view in horizontal section, on the plane IV—IV of Fig. III, of the modified structure; and Figs. V and VI are views of the same in cross section, on the planes V—V and VI—VI, respectively, of Fig. IV.

The furnace regenerator in which my invention is practiced embodies essentially two or more chambers severally including bodies of checkerwork. A regenerator is installed at each of the opposite ends of the furnace, and the hot waste gases of the furnace are passed from the outgo port at one end of the furnace, first through one body of checkerwork and then through the other, while the air for combustion is led through the bodies of checkerwork in the regenerator at the opposite end of the furnace and introduced to the firing port. In passing through the regenerator at the outgo end of the furnace, the hot waste gases yield large stores of heat to the bodies of checkerwork. When the furnace is reversed, and the port which had been serving as the outgo port becomes the firing port, the air for combustion is passed through the heated bodies of checkerwork and preheated on its way into such port, while the waste gases of the furnace are led off through the regenerator which, before such furnace reversal, had been preheating the air. The art is familiar with many regenerator constructions, in which the checkerwork chambers, and the passageways leading to, between, and from them, vary in specific arrangement, and, while my invention, as those skilled in the art will perceive, may be embodied and practised in these various constructions, I shall first describe the invention as I have applied it with particular advantage to a regenerator of the sort illustrated and described in Letters Patent of the United States No. 2,009,236, granted to me on July 23, 1935. Such regenerator embodies two elongate chambers, arranged side-by-side under a common arched roof, and each chamber includes a body of checkerwork. When the regenerator is being heated, the hot waste gases of the furnace stream vertically downward from the outgo port of the furnace into a slag pocket, whence they are delivered horizontally into the bottom of one of the regenerator chambers. Upon streaming in horizontal course over the floor of such chamber, the hot gases ascend through the body of checkerwork in the chamber, and yield stores of heat to the refractory bodies of which the checkerwork is in usual manner formed. Upon rising from such checkerwork, the gases flow transversely to their line of delivery to the regenerator, and enter the top of the body of checkerwork in the second chamber, whence they descend and yield stores of heat to the checkerwork. Upon emerging from the bottom of this second body of checkerwork, the gases flow, in direction parallel to the course of their delivery into the first chamber, into the usual stack flues.

Referring to Figs. I and II of the drawings, the elongate chambers of this exemplary regenerator are shown at 2 and 3. The chambers are arranged side-by-side and separated by a vertical wall 4. The wall 4 terminates at an interval beneath the roof I of the regenerator, providing a rectangular orifice 9 that opens, between the chambers 2 and 3, transversely of the regenerator. In accordance with recognized good practice the regenerator is constructed of refractory masonry, insulated in known way, and braced and reinforced with structural steel and tie-rods (not shown). The reference numeral 5 is applied to the downtake, through which the waste gases stream from the outgo port of the furnace (not shown). The numeral 6 indicates the usual slag pocket at the bottom of the downtake, and 7 the passage by means of which communication is established between the slag pocket and the regenerator chamber 2. The body 8 of checkerwork within chamber 2 is constructed of refractory tiles and blocks, of the sort described in Patent No. 1,686,826, granted to me October 9, 1928; the checkerwork is supported on two lines of rider arches 80, formed of refractory tile and bridging the intervals between the opposite side walls of the chamber 2 and an intermediate wall 20, and providing two parallel passages 21 and 22 that extend lengthwise of the chamber 2 beneath the body of checkerwork therein. As will be understood upon reference to Fig. I, the slag pocket 6, passage 7 and passages 21, 22 are so relatively disposed and proportioned that together they provide an elongate, substantially horizontal chamber in which the dust, carried over from the furnace, may settle out of the waste gases in the course of their travel from the downtake 5 into the regenerator. (Reference may be had to my above-noted Patent No. 2,009,236 for a more detailed consideration of this matter of dust precipitation.) From the passages 21, 22 the streaming gases rise through the passages formed by and between the rider arches 80 and the tiles and blocks of checkerwork 8. Upon emerging from the top of the checkerwork 8 the gases flow through orifice 9 into the top of chamber 3.

Chamber 3 houses a body 30 of checkerwork; the checkerwork 30 is relatively deep with respect to the body of checkerwork in chamber 2; it rests on lines of rider tiles 31 extending transversely of the chamber, with the several lines arranged in spaced-apart relation longitudinally of the regenerator, and supported upon rider walls 32. The rider walls 32 run lengthwise of the chamber 3, and form beneath the body of checkerwork four passages 10 that open into the usual stack-flue (not shown).

Upon passing from the top of chamber 2 into chamber 3, the hot flowing gases stream downward through the checkerwork 30, and enter the passages 10 beneath, whence they flow into the flue leading to the stack. In their travel through the regenerator the waste gases of the furnace yield large quantities of heat to the refractory walls of the chambers 2 and 3 and to the bodies of checkerwork included therein.

As already mentioned my present invention embraces particular refinements in regenerator construction, to the end that at minimum cost and refinement in structure the efficiency of a regenerator of given size may be increased, without the checkerwork of the regenerator becoming fouled and plugged in a relatively short period of operation. Turning again to the drawings, I shall consider the features of construction and operation which are important to such end.

Whereas in the usual regenerator, as in the regenerator of my above-noted Patent No. 2,009,236, the rider arches which support the checkerwork are widely spaced, in my improved regenerator they are closely arranged, as may be perceived in Fig. I. More specifically, the arches 80 are so arranged that the total area of the passageways 81 between them is substantially less than the total effective area of the passageways extending through the body 8 of checkerwork above. In establishing such relation between the effective area of the passages between the rider arches and the passages through the body 8 of checkerwork, advantageous variations in the velocity of the flowing gases are obtained, in the region of admission of the gases to such body of checkerwork. The velocity of the gases, rising from the horizontal passages 21 and 22 and entering the checkerwork 8, is first accelerated (due to the relatively small effective area of passages 81) and then retarded (due to the relatively large effective area of the passages in the checkerwork). In a typical installation the total area of the passages or slots 81 between the rider arches was established at twenty-five per cent. of the total effective area of the passages through the body 8 of checkerwork, and it was found that the velocity of the gases entering the passages 81 was increased to one hundred and fifty per cent. of the velocity of the gases in passageways 21, 22. And upon passing into the checkerwork this velocity was immediately reduced to about twenty per cent. of the velocity of flow through the passage 81.

Considering the movement of the gases more minutely, it is to be noted that the total throat area of the downtake 5 is approximately twice that of the usual downtake, and that by virtue of such feature the velocity of the waste gases streaming downward therein is relatively low—in this case a velocity of approximately 18 to 20 feet per second—whereby the erosion of the refractory walls is reduced to a minimum. The cross-sectional area of the slag pocket 6, considered with respect to the direction of flow of the waste gases, together with the mean cross-sectional area of the passages 7 and 21, 22, so far exceeds the effective area of the downtake 5 that the velocity of the gases is substantially decreased as they enter and proceed through the horizontal course of flow provided by the slag pocket 6, passage 7, and passageways 21, 22. In the exemplary case the gases stream downward in the downtake at a velocity of from 18 to 20 feet per second and are retarded to a velocity of 10 feet per second as they enter the slag pocket 6 and flow through passages 7 and 21, 22. This drop in velocity, together with the change in direction of flow (from vertical to horizontal direction) causes the molten slag and larger dust particles to precipitate, and to settle to the bottom of the slag pocket. In the horizontal course of flow (6, 7 and 21, 22) the gases proceed at reduced velocity a distance of approximately 45 feet, and in such course of flow, the fine dust particles—the particles that precipitate at constant velocity, as explained in my last-noted patent—settle out of the gases and collect on the floor of regenerator chamber 2. Due to the relatively large exposed area of the floor of chamber 2, the regenerator is adapted to hold one year's accumulation of dust and slag without unduly impairing efficiency.

From the passages 21, 22, the gases rise, as already mentioned, through the relatively small openings or slots 81 between the rider arches 80, and upon entering these openings or slots the velocity of flow is increased from the exemplary value of ten feet per second to twenty-five. In addition to effecting such acceleration, these narrow slots 81 operate to insure a uniform distribution of flow over the entire horizontal reach of the body of checkerwork 8. As the gases rise from the slots 81 and enter the passages in the checkerwork, the velocity of flow immediately drops to about 5 feet per second. I have found that such changes in velocity of the rising gases effect in the lower regions of the checkerwork 8 a precipitation of a large proportion of the fine dust particles remaining in the gases. The precipitated material settles to the floors of passageways 21, 22.

Upon rising from the body of checkerwork 8, the gases flow transversely of the regenerator through the orifice 9, whose effective area is substantially less than the total effective area of the passages in the checkerwork 8—in this case the ratio of areas is one to five, and the gases are accelerated from a velocity of five feet per second at the top of checkerwork 8 to about thirty-five feet per second through the orifice 9. The vertically narrow and horizontally elongate orifice 9, together with the greatly accelerated velocity, is effective to insure a uniform spreading and distribution of the gases over the top of the checkerwork 30 in chamber 3. The gases enter the passageways in the checkerwork 30 and flow downward. The total effective area of such passageways is much greater—say four hundred per cent. greater—than the area of the orifice 9, and it will be understood that the gases flow through the checkerwork at greatly reduced velocity, whence they enter the passages 10 beneath. As in the case of the rider arches 80, the lines of rider tile 31, upon which the checkerwork 30 is borne, are arranged in closely spaced relation. Specifically, the tiles are so proportioned and spaced that the total area of the passages between them equals about twenty-five per cent. of the area of the passages through the checkerwork 30. Thus, the velocity of flow between the checkerwork and the passages 10 is greatly accelerated. These features assist and cooperate with the features already described in effecting the desired stream-line and uniformly distributed flow of gases through the bodies of checkerwork. Upon entering the passages 10, the gases flow at reduced velocity to the stack of the furnace.

In the operation of the apparatus as described above the method defined in the appended claims is practiced, and the objects of the invention are realized in fullest measure.

It may be mentioned that in accordance with the invention described in application Serial No. 115,946, filed by me on December 15, 1936, I provide in the end wall 1a (Fig. I) of the regenerator a plurality of openings, normally closed by refractory plugs 1b. By removing these plugs access is obtained to the bodies of checkerwork and rider tiles within the chambers 2 and 3, and steam or air jets may be played into and within the regenerators, to dislodge accumulations of dust from the surfaces of the refractories. The dislodged dust either settles to the floor of the regenerator or is carried out with the flowing gases.

In Figs. III to VI, I show the regenerator as it is modified for use in furnaces that burn gaseous fuel. In such furnaces both the fuel and the air for combustion are preheated, and each of the regenerators comprises in effect two regenerators, arranged side by side in a single unit of construction.

Referring to Fig. IV, the modified regenerator of the invention consists in a rectangular housing 1c which is divided by a partition 20c. The partition 20c continues from the housing 1c into the downtake 5c, and divides the downtake into two passages 5d and 5e. On each side of the partition 20c, a wall (4c on one side and 4e on the other) divides the enclosure into two compartments (2c and 3c on one side and 2e and 3e on the other), and a body of checkerwork is built into each compartment.

In service a regenerator is arranged with each of the ports of the furnace. At the outgo port 30 the hot waste gases of the furnace stream downward through passages 5d and 5e, and flow through the bodies of checkerwork on opposite sides of the partition 20c to the usual stack flue. The checkerwork absorbs stores of heat from the flowing gases. When the furnace is reversed and the outgo port becomes the firing port, the gaseous fuel for the furnace is passed through the regenerator on one side of the partition 20c and the air for combustion on the other. The fuel and air, thus led in independent streams through the hot checkerwork of the regenerator, rise through passages 5d and 5e and enter the firing port of the furnace. More specifically, the gaseous fuel is delivered through an opening 11e (Fig. IV) into the bottom of chamber 3e, whence it streams upward through the body of checkerwork 30e (Fig. VI), flows over wall 4e to the top of checkerwork body 8e (Fig. V), descends through checkerwork 8e into passage 21e, and from such passage streams upward in uptake 5e (Fig. IV) to the furnace port. The air for combustion is passed in parallel course through the bodies of checkerwork 30c and 8c on the opposite side of the partition 20c, and upon flowing upward through passage 5d enters the port with the fuel. In such movement through the regenerator the air and fuel are preheated to the desired degree.

The volume of air required is far greater than the volume of fuel, and it is for this reason that the checkerwork compartments and passages of the regenerator for the fuel are smaller than those for the air.

The structural features of the regenerator illustrated in Figs. I and II are present in the modified regenerator of Figs. III to VI, but it will be understood that the modified regenerator includes refinements in structure which, with superior method of operation, are of value apart from, as well as with, the features first described. In Fig. III the internal construction of the compartments 2c and 3c of the modified regenerator is illustrated, and in the matter of general construction this showing will serve also for the compartments 2e and 3e.

As in the structure first described, a slag pocket 6c is arranged at the bottom of the downtake passages 5d, and a horizontal passage 7c establishes communication between the slag pocket and passage 21c beneath the checkerwork in chamber 2c. The bodies of checkerwork in chambers 2c and 3c may be, and in this case are, constructed of the refractory blocks and tile described in Patent No. 1,686,826, above mentioned. The body of checkerwork 8c in compartment 2c is of substantially less depth than the body 30c in compartment 3c. And both the relatively shallow and relatively deep bodies of checkerwork are supported on rider arches 80c that are arranged in closely spaced relation. The areas of the passages 5d, 6c, 7c, 21c; the total area of the slots 81c between the rider arches; the area of the orifice 9c between the upper edge of wall 4c and the arched roof of the regenerator; the total area of the passages (81c) at the bottom of checkerwork 30c; and the effective area of passage 10c all bear the relations to one another described in the structure of Figs. I and II, and other than in the following particulars further description is needless:

In the operation of the regenerator (at the outgo end of the furnace), the hot waste gases are led downward in divided stream in passages 5d and 5e into slag pockets (cf. slag pocket 6c at bottom of passages 5d in Fig. III); the divided stream of hot gases flows at reduced velocity and in horizontal direction to the bottoms of the relatively shallow bodies of checkerwork 8c and 8e separated by wall 20c; the separated streams of gases ascend between the rider arches 80c into the bodies of checkerwork, with the velocity of the gases first increasing and then decreasing, as already explained; rising at decreased velocity the parallel streams of hot gases yield stores of heat to the two bodies of checkerwork; upon emerging from the bodies of checkerwork, the streams of gases are directed in parallel horizontal courses through orifices 9c and 9e (Figs. III and VI), with the consequence and effect that the velocities of the streams are increased and the flowing gases are spread and distributed over the tops of the relatively deep bodies of checkerwork 30c and 30e; entering these bodies of checkerwork the gases meander downward at decreased velocity and yield stores of heat; and, upon reaching the bottoms of such relatively deep bodies of checkerwork, the separated streams of gases flow with increased velocity between the rider arches 80c into passages 10c and 10e, whence they flow at decreased velocity to the usual outlet flues or stack (not shown). Thus, the regenerator is supplied with stores of heat, which, when the furnace is reversed, are employed to preheat fuel and air passed in parallel streams through the regenerator, as already described. It is characteristic of the modified structure of Figs. III to VI that in general the two streams of waste gases, and, alternately, the companion streams of fuel gas and air, flow through the regenerator in a succession of horizontal and vertical reaches or paths, and that the successive paths followed by one stream define a vertical plane paralleling the plane defined by the paths followed by the other stream.

As indicated in the foregoing specification, the particular area ratios specified in connection with the several passes through the regenerator are exemplary only, and the same holds true for the specified variations in the velocities of the flowing gases. For example, I have said that the total effective area of the passages or slots between the rider arches is twenty-five percent. of the effective area of the passages extending through the checkerwork above; that the velocity of the gases entering the slots increases from ten feet per second to twenty-five; and that such velocity drops to a value of five feet per second as the gases leave the slots and ascend in the passages in the checkerwork. While these values have been found ideal for a given installation, it will be understood that in order to obtain the desired results in other installations the area ratios and velocities of flow may be modified. Specifically, the total area of the slots between the rider arches may be so far modified as to comprise fifty or even seventy-five per cent. of the total area of the passages in the checkerwork above, and, of course, there will be corresponding departures from the specified velocities of flow. But in any case, the total area of the slots is, advantageously, less than the total area of the passages in the checkerwork, so that the velocity of the gases on their way into the checkerwork is first accelerated and then retarded. And it is to be understood that these comments on permissive modifications apply to the area ratios and velocities at such other regions of flow in the regenerator as have been particularly mentioned in the above specification.

While the regenerator has been described in conjunction with an open-hearth furnace, it will be understood that it may be used with glass furnaces or tanks, or other regenerative furnaces whose waste gases include molten particles, condensate, or dust. And it is to be noted that the structure shown in Figs. III to VI is particularly efficient in glass furnaces, it being understood that the downtake from the port of a glass furnace may open at its bottom immediately into the regions (21c, 22c and 21e) beneath the relatively shallow bodies of checkerwork.

I claim as my invention:

1. The herein described method of operating a regenerator including a plurality of bodies of checkerwork, which method includes leading the hot waste gases of a furnace downward from the outgo port of the furnace, delivering the gases in direction extending angularly to the line of their descent into a region beneath one of said bodies of checkerwork, leading the gases upward from such region and introducing them with accelerated velocity into the bottom of said last-mentioned body of checkerwork and immediately thereafter retarding the velocity of the flowing gases and leading them, with release of stores of heat, upward through the checkerwork at retarded velocity, conducting the gases rising from the top of said body of checkerwork at low velocity as compared with the velocity at which the gases enter such body to the top of a second body of checkerwork and in the course of flow between such bodies of checkerwork effecting an acceleration and then a retardation in the velocity of the gases, leading the gases downward, with further release of heat, through said second body of checkerwork at relatively low velocity, drawing the downwardly flowing gases from the bottom of said second body of checkerwork at accelerated velocity, leading the gases at reduced velocity from the region below said second body of checkerwork to an outlet, and from time to time interrupting such flow of waste gases and leading air to be preheated in counter direction through said bodies of checkerwork and effecting in the sequence described the alternate acceleration and retardation in the velocity of the flowing air.

2. A regenerator including two chambers interconnected above for the flow of gas with accelerated velocity from one chamber to the other, a body of checkerwork arranged in each chamber, passages opening into each chamber beneath the body of checkerwork therein, means at the bottom of one of said bodies for accelerating the flow of gases rising thereinto, and means at the bottom of the other of said bodies for accelerating the flow of gases descending therefrom.

3. A regenerator including a body of checkerwork supported on rider-arches spaced to provide flow-controlling passages with a total effective area limited to a value substantially less than the total effective area of the passages in the body of checkerwork above.

FRED H. LOFTUS.